US011663259B2

(12) United States Patent
Grabovitch-Zuyev et al.

(10) Patent No.: US 11,663,259 B2
(45) Date of Patent: *May 30, 2023

(54) AUTOMATIC ELECTRONIC MESSAGE CONTENT EXTRACTION METHOD AND APPARATUS

(71) Applicant: YAHOO ASSETS LLC, New York, NY (US)

(72) Inventors: Irena Grabovitch-Zuyev, Nehariya (IL); Abhinav Pundir, San Jose, CA (US); Noa Avigdor-Elgrabli, Haifa (IL); Dotan Di Castro, Haifa (IL); Iftah Gamzu, Rishon Lezion (IL); Liane Lewin-Eytan, Binyamina (IL)

(73) Assignee: YAHOO ASSETS LLC, New York, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/226,746

(22) Filed: Apr. 9, 2021

(65) Prior Publication Data
US 2021/0224305 A1 Jul. 22, 2021

Related U.S. Application Data

(63) Continuation of application No. 16/272,285, filed on Feb. 11, 2019, now Pat. No. 10,977,289.

(51) Int. Cl.
*G06F 16/35* (2019.01)
*G06F 16/34* (2019.01)
(Continued)

(52) U.S. Cl.
CPC ............ *G06F 16/35* (2019.01); *G06F 16/345* (2019.01); *G06F 16/83* (2019.01); *G06N 20/00* (2019.01)

(58) Field of Classification Search
CPC ......... G06F 16/345; G06F 16/83; G06F 16/35
(Continued)

(56) References Cited

U.S. PATENT DOCUMENTS 7,877,682 B2 1/2011 Aegerter
7,912,705 B2 * 3/2011 Wasson ................ G06F 16/313
715/256

(Continued)

FOREIGN PATENT DOCUMENTS

CN 104881488 A 9/2015

OTHER PUBLICATIONS

Avigdor-Elgrabli et al., "Structural Clustering of Machine-Generated Mail," 10 pages (2016).
(Continued)

*Primary Examiner* — Shahid A Alam
(74) *Attorney, Agent, or Firm* — James J. DeCarlo; Greenberg Traurig, LLP

(57) ABSTRACT

Disclosed are systems and methods for improving interactions with and between computers in electronic messaging, and other, systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically generating data extraction rules, which can then be used to automatically extract data from electronic messages.

20 Claims, 12 Drawing Sheets

(51) Int. Cl.
*G06N 20/00* (2019.01)
*G06F 16/83* (2019.01)

(58) Field of Classification Search
USPC .......................................................... 707/737
See application file for complete search history.

(56) References Cited

U.S. PATENT DOCUMENTS

| | | |
|---|---|---|
| 7,912,947 B2 | 3/2011 | Thain et al. |
| 7,984,037 B2 | 7/2011 | Wan et al. |
| 8,661,001 B2 | 2/2014 | Eliashberg et al. |
| 8,738,721 B1 | 5/2014 | Smirnov et al. |
| 8,898,144 B2 | 11/2014 | Allen et al. |
| 9,323,826 B2 | 4/2016 | Bailey et al. |
| 9,418,069 B2 | 8/2016 | Li et al. |
| 10,021,054 B1 | 7/2018 | Zhou et al. |
| 10,055,429 B2 | 8/2018 | Jiao et al. |
| 2003/0229854 A1 | 12/2003 | Lemay |
| 2004/0148278 A1 | 7/2004 | Milo et al. |
| 2004/0158799 A1 | 8/2004 | Breuel |
| 2006/0167860 A1 | 7/2006 | Eliashberg et al. |
| 2009/0216874 A1* | 8/2009 | Thain ...................... H04L 43/04 709/224 |
| 2010/0241639 A1* | 9/2010 | Kifer ..................... G06F 16/313 707/754 |
| 2011/0106892 A1 | 5/2011 | Nelson et al. |
| 2012/0317472 A1* | 12/2012 | Chernysh .............. G06F 40/131 715/234 |

OTHER PUBLICATIONS

Di Castro et al., "Enforcing k-anonymity in Web Mail Auditing," 10 pages (2016).
Di Castro et al., "Automated Extractions for Machine Generated Mail," 8 pages (2018).

* cited by examiner

| | XPATH1 | XPATH2 | XPATH3 | XPATH4 | XPATH5 | XPATH6 | XPATH7 | ... |
|---|---|---|---|---|---|---|---|---|
| Msg 1 | Thank you John!, | Below is ... | Upcoming Trip: | 08/07/16 - Ontario | ... | AIR Confi... | ABC123 | ... |
| Msg 2 | Thank you Arya!, | Below is ... | Upcoming Trip: | 09/06/16 – New York | ... | AIR Confi... | Z5T8Q2 | ... |
| Msg 3 | Thank you Khal!, | Below is ... | Upcoming Trip: | 08/23/16 - Boston | ... | AIR Confi... | ER46T1 | ... |
| Msg 4 | Thank you Lucy!, | Below is ... | Upcoming Trip: | 08/13/16 - Seattle | ... | AIR Confi... | 61FXC1 | ... |
| Msg 5 | Thank you Rob!, | Below is ... | Upcoming Trip: | 08/09/16 - Portland | ... | AIR Confi... | WQE47X | ... |
| ... | | | | ... | | | ... | |

Figure 7

Dictionaries, e.g.:
- Names
- Addresses
- Airport codes
- Places
- Products

Format patterns, e.g.:
- Dates
- Times
- Mail Addresses
- Currency
- Numbers
- URLs

Fig. 8

AUTOMATIC ELECTRONIC MESSAGE CONTENT EXTRACTION METHOD AND APPARATUS

CROSS REFERENCE TO RELATED APPLICATIONS

This application is a continuation of and claims priority from co-pending U.S. patent application Ser. No. 16/272,285, filed Feb. 11, 2019, entitled AUTOMATIC ELECTRONIC MESSAGE CONTENT EXTRACTION METHOD AND APPARATUS, which is hereby incorporated by reference.

FIELD OF THE DISCLOSURE

The present disclosure relates to extraction of content of electronic messages, such as electronic mail messages.

BACKGROUND

Currently, a large corpus of electronic messages are machine generated. One example of an electronic message is an electronic mail (or email) message. Recent studies have shown that more than 95% of non-spam electronic mail traffic transmitted via the Internet is machine generated. That is, most electronic mail, or email, message folders, e.g., inboxes, are mostly comprised of machine-generated email messages (e.g., email messages generated automatically by computing devices using automated scripts). In many cases, the email messages originate from commercial entities and organizations. For example, automatically-generated email messages might contain a shipment notification, flight itinerary, purchase or order receipt, calendar event, newsletter, etc.

SUMMARY

The present disclosure provides novel systems and methods for automatic generation of data extraction rules for extracting data from electronic message content. Since a majority of electronic messages are machine generated, such electronic message traffic is structured and repetitive in nature. Such structure and repetitiveness is leveraged in generating data extraction rules that can then be used on any electronic messages, such as a new (e.g., arriving) email message, to automatically extract data from the electronic message.

As discussed above, 95% of non-spam electronic mail traffic transmitted via the Internet is machine generated. However, there is no standardization (e.g., automated script standardization across senders and/or electronic message types, such as and without limitation purchase order, flight itinerary, etc. message types) used in generating the electronic messages.

Presently, data extraction from electronic messages requires manual generation of data extraction rules. Manual generation of data extraction rules requires that a number of human editors review electronic messages and manually generate each data extraction rule based on the review. For example, an email message containing a purchase receipt received from an online vendor is reviewed by a human editor and the human editor defines one or more data extraction rules for extracting data from the email message. Since there is no standardization across senders and no standardization across message types, human editors must review each message type for each sender and generate one or more extraction rules based on the review.

In addition, human editors are needed to update or generate new extraction rules anytime a sender makes changes to an automatically-generated electronic message (such as by making changes to the script used to generate the electronic message). Given the magnitude of email message traffic, the lack of standardization across senders and message types and the likelihood of changes to the scripts used in the generation of the electronic messages, it is not feasible to manually generate data extraction rules using human editors. The cost alone of using human editors makes manual generation of extraction rules prohibitive. In addition, the use of human editors introduces latency in the process, which results in a delay in the availability extraction rules as well as a delay in the availability of the extracted data. Given the sheer volume of emails being sent each day and the changing nature of machine generated emails, extraction by humans is no longer possible at the scale required in modern email systems.

The disclosed systems and methods address problems inherent in prior approaches and automatically generate data extraction rules which can then be used in an automatic extraction of data from electronic messages. The disclosed systems and methods enable rapid and automatic data extraction rule generation, as well as rapid and automatic data extraction using the automatically-generated extraction rules. This presents improvements to the timeliness of, and availability of, data extraction rules (which are automatically generated), as well as improvements to the timeliness of, and availability of, data automatically extracted using the automatically-generated extraction rules which improves the user experience since data extraction assists in placing most relevant information in front of the user more quickly and efficiently.

According to some embodiments, the disclosed systems and methods first analyzes a corpus of electronic messages, e.g., email messages, collected over a number of days, which may or may not be consecutive days. The analysis groups the corpus of messages into a number of clusters. In one or more embodiments, the messages assigned to a given cluster are from the same domain and share the same structure (or have a common structure). In accordance with one or more embodiments, the analysis comprises using the Document Object Model (DOM) tree representing the components, e.g., markup language elements, of each electronic message. Each message can be represented as an ordered list of the eXtensible Markup Language (XML) Path Language (or XPATH) expressions that lead to textual leaves in the DOM tree. The XML Path language is a query language that can be used in selecting nodes from an XML document. An XPATH expression (also referred to herein as an XPATH) is used to select a portion of an XML (or other markup language) document, e.g., text associated with a textual leaf of a DOM tree. Each XPATH expression in an ordered list of expressions (leading to textual leaves) corresponding to an electronic message can be used to extract a portion (e.g., the text associated with a textual leaf) of the electronic message. A digital signature, such as a hash value referred to herein as a Mail-Hash, can then generated for the ordered list of XPATH expressions using a hash algorithm. A Mail-Hash digital signature can be generated for each electronic message in the corpus, and the electronic messages in the corpus can be clustered (such that each electronic message is assigned to one cluster) according to each message's digital signature. The electronic messages belonging to a given cluster share the same digital signature. In accordance with at least one embodiment, each cluster is characterized by a domain (or domain name, such as united.com) and a Mail-Hash digital signature.

The disclosed systems and methods then, for a given cluster, select a number of electronic messages belonging to the cluster. The number can be any size (or number) of electronic messages, such as and without limitation several dozens, of messages. The number can be a threshold number determined to allow effective identification (with a desired precision) of variable data in the messages. In some embodiments, XPATH values sampled from each electronic message selected from a cluster can be represented in a table, or in a tabular form, where each row corresponds to a selected electronic message and each column corresponds to an XPATH value, which can be constant value, a variable value or a combination of constant and variable values. In the case of a constant XPATH, the value for the XPATH is the same across all of the electronic messages. In the case of a variable XPATH, at least a portion of the XPATH's value varies for at least some of the electronic messages. In other words, a variable XPATH can have a variable portion without a constant portion. Alternatively, a variable XPATH can include a variable value portion (which varies across at least some of the electronic messages in the selection) in combination with a constant value portion (which is the same across all of the electronic messages in the selection). In the latter case, at least some portion of the XPATH's value is the same across the electronic messages in the selected electronic messages and at least some portion of the XPATH's value varies across the selected messages.

The disclosed systems and methods then automatically generate extraction rules using the sampled values, e.g., stored as a table, for the given cluster. In accordance with one or more embodiments, an automatically-generated extraction rule corresponds to an XPATH. An automatically-generated data extraction rule provides a description of how to extract variable data items from the XPATH. Additionally, the automatically-generated data extraction rule suggests an annotation indicating a context (or meaning) for each data item (each variable data item) extracted.

In accordance with at least one embodiment, automatic extraction rule creation comprises two phases: 1) basic rule creation; and 2) rule refinement. In basic rule creation, each XPATH is taken separately and the sample values for the XPATH across the electronic messages are analyzed. A rule is automatically generated that identifies each variable part of the XPATH. In addition, a general annotation (indicating a general meaning of the variable part) is determined for each variable part. For example, a general annotation might identify a variable part as a name, an airport code, a date, etc. In the second phase, a rule is refined to include more specific, or precise, annotations (indicating more specific, or precise, meaning) for each variable part. In this phase, a general annotation is refined to provide a more precise annotation that holds some contextual meaning. For example, a general annotation identified in the first phase may be an airport code and a more precise annotation determined in the second phase may further refine the annotation to indicate that it is a departure airport code or an arrival airport code in a flight itinerary.

In the second phase, instead of a local XPATH view, connections between multiple XPATHs and/or cluster-wide connections can be considered. As annotations take context (from multiple XPATHs and/or from a cluster-wide perspective) into consideration, annotations can be specifically tailored to a use case. For example, annotations used for flights versus annotations used for purchase order/receipts.

As yet further illustrative examples, a date value in an electronic message containing itinerary information may represent a departure or arrival date, while a date value in an electronic message containing a shipping notification may represent an expected delivery date. In accordance with one or more embodiments, each cluster can have a use-case classification (which can be determined using a trained classifier) which provides a mechanism to limit the annotations under consideration.

The disclosed systems and methods then apply one or more automatically-generated data extractions rules to an electronic message, such as a new (e.g., newly-arriving) message, to extract the values associated with each variable data part of the electronic message. The annotation associated with the variable part determined using the first and second phases discussed herein provides a contextual meaning for the extracted data. In accordance with one or more embodiments, as part of the automatic data extraction, the new electronic message is assigned to one of the electronic message clusters. The new electronic message is assigned to a cluster of electronic messages using the sender's domain (e.g., determined using the sender information in the new electronic message) and a digital signature (a Mail-Hash signature) determined for the new electronic message using the new message's ordered list of XPATH expressions (leading to textual leaves). The electronic message cluster that is selected is associated with the sender's domain (of the new electronic message) and the Mail-Hash signature (of the new electronic message). Since the cluster and the new electronic message share the same Mail-Hash, the new electronic messages shares the same structure, including the same ordered list of XPATH expressions leading to textual leaves, as the electronic messages used in the automatic generation of the data extraction rule(s) to be used on the new electronic message to automatically extract data from the new electronic message. The automatically-generated extractions rules corresponding to the cluster are then used to extract the variable data items from the new electronic message.

It will be recognized from the disclosure herein that embodiments of the instant disclosure provide improvements to a number of technology areas, for example those related to systems and processes that handle or process electronic messages, such as but not limited to, online electronic mail systems, digital text messaging systems, etc. as well as travel assistance systems, search engines, online advertising systems, online recommendation systems and the like.

The disclosed systems and methods can effectuate increased speed and efficiency in the ways that extraction rules are generated automatically, and in the ways that data is automatically extracted using the automatically-generated extraction rule(s), as the disclosed systems and methods, inter alia, eliminate the use of human editors in the generation of extraction rules. Data extraction rules are automatically generated and such automatically-generated data extraction rule(s) can be used in automatically extracting data from electronic messages, and automatically-extracted data can be used in a number of ways, including providing data extracted from one or more electronic messages in a summarized manner to users through the disclosed systems' and methods. As the disclosed systems and methods automatically generate one or more data extraction rules using electronic messages as a guide, one or more automatically-generated data extraction rules can be used in automatically extracting data from electronic messages, and the automatically-extracted data can be presented to the user or other entity without the need to search for or open the electronic messages from which the data is automatically extracted, thus improving access, for a user of electronic messages, to content contained in electronic messages.

In accordance with one or more embodiments, a method is disclosed which includes receiving, at a computing device, a data extraction rule creation request in connection with a corpus of electronic messages; retrieving, via the computing device, the corpus of electronic messages; assigning, via the computing device, each electronic message, of the corpus, to one cluster of a plurality of clusters, a cluster of the plurality having an assigned set of electronic messages, from the corpus of electronic messages, the cluster having an associated set of XPATH expressions shared by each electronic message in the assigned set, each XPATH expression of the set of XPATH expressions leading to a textual leaf in a DOM tree of each electronic message in the assigned set, each XPATH expression having a corresponding value correspond to each of the electronic messages in the assigned set; determining, via the computing device and for the cluster of the plurality, that the corresponding value for each of a number of the XPATH expressions, in the set of XPATH expressions associated with the cluster, comprises a variable value, such that for an XPATH expression, of the number, the variable value indicates that at least a portion of the corresponding value of the XPATH expression varies across the number of electronic messages in the assigned set; automatically determining, via the computing device and for each XPATH expression of the number of XPATH expressions associated with the cluster, an annotation, for the variable value, the determining the annotation comprising analyzing the variable value corresponding to at least one electronic message of the number of electronic messages to determine the annotation; automatically refining, via the computing device and for each XPATH expression of the number of XPATH expressions associated with the cluster, the annotation, the refining for an XPATH expression of the number comprising using the corresponding value of at least one other XPATH expression of the set to determine a meaning of the variable value of the XPATH expression and using the meaning of the variable value to refine the annotation associated with the XPATH expression; and automatically generating, via the computing device and for the cluster, a data extraction rule, the automatically-generated data extraction rule comprising the annotation associated with each XPATH expression having a variable value; automatically extracting, via the computing device and using the automatically-generated data extraction rule, data from another electronic message; the data extracted from the other electronic message comprising the variable value of each XPATH expression of the number, automatically extracting the data comprising associating the variable value for an XPATH expression, of the number, with the associated annotation providing the meaning of the variable value; and communicating, via the computing device, the automatically extracted data to an entity.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically generating data extraction rules and automatically using automatically-generated rules to automatically extract data from electronic messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIGS. 5-11 are each a diagram of an exemplary example of a non-limiting embodiment in accordance with some embodiments of the present disclosure.

DETAILED DESCRIPTION

Figure 1:
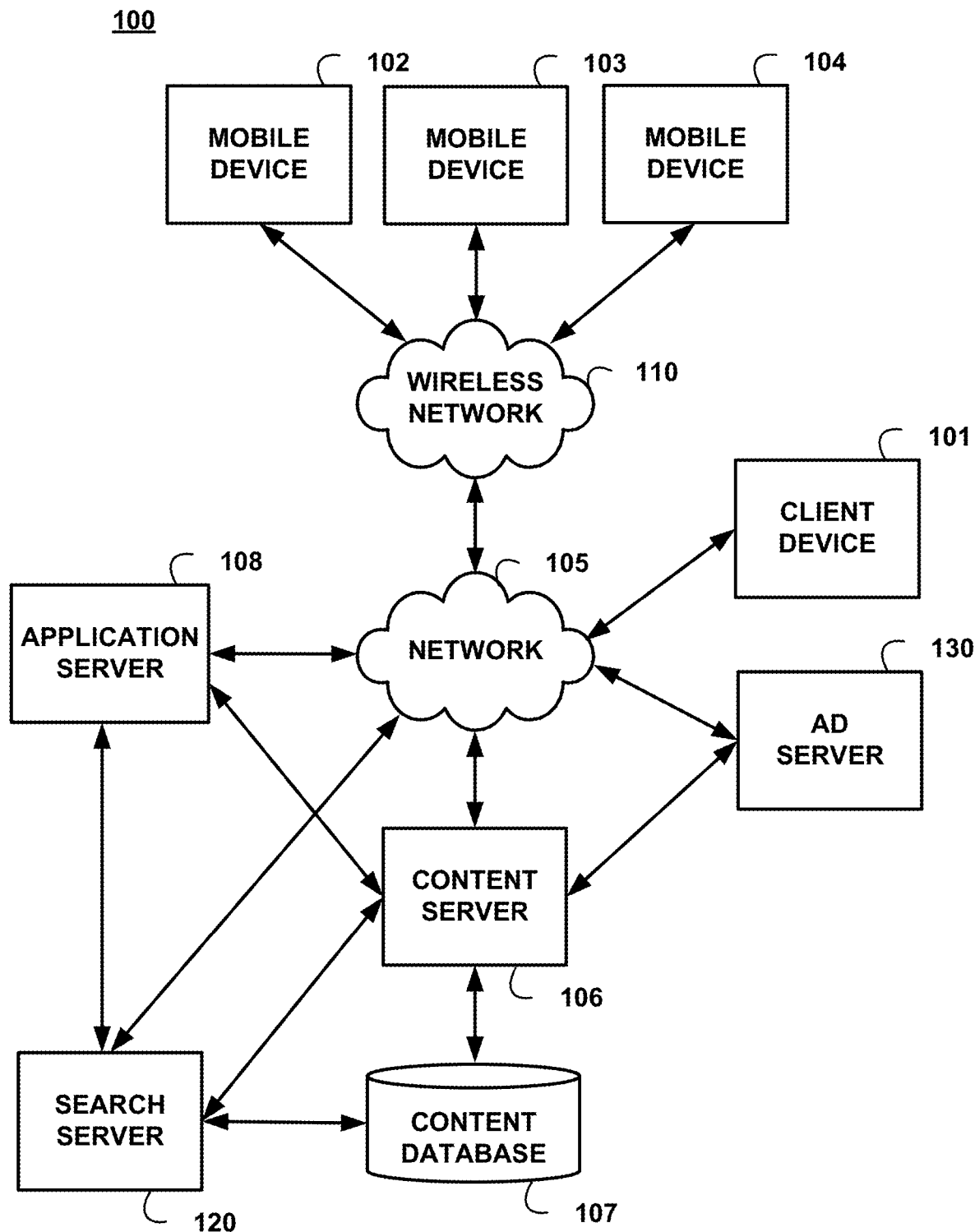
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, an electronic message can be an electronic mail (or email) message, short message, social media (or other) post, etc. While embodiments are described using email as an example, it should be apparent that any type of electronic message can be used.

As discussed above, 95% of non-spam electronic mail traffic transmitted via the Internet is machine generated. While the vast majority of messages are machine generated, there is no standardization (e.g., automated script standardization) for generating the email messages across senders and/or email message types (e.g., purchase order, flight itinerary, etc.).

Presently, data extraction from electronic messages requires manual generation of extraction rules. Manual generation of extraction rules requires that a number of human editors review electronic mail messages and manually generate each extraction rule. For example, an email message containing a purchase receipt received from an online vendor is reviewed by a human editor and the human editor defines one or more extraction rules for extracting data from the email message. Since there is no standardization across senders, human editors must review each sender's purchase receipt (or other type of message) and generate one or more extraction rules for each sender's message.

In addition, human editors are needed to update or generate new extraction rules any time a sender changes format of (or script used to generate) an automatically-generated email message. Given the magnitude of email message traffic, the lack of standardization across senders and message types and the lack of permanency in format, it is not feasible to manually generate extraction rules using human editors. The cost alone of using human editors makes manual generation of extraction rules prohibitive. In addition, the use of human editors introduces latency in the process, which results in a delay in the availability extraction rules as well as a delay in the extraction of data.

The disclosed systems and methods automatically generate extraction rules and then use the automatically-generated rules in an automatic extraction of data from electronic messages. The disclosed systems and methods enable rapid and automatic extraction rule generation, as well as rapid automatic data extraction using the automatically-generated extraction rules. This presents improvements to the timeliness of, and availability of, extraction rules, as well as improvements to the timeliness of, and availability of, data automatically extracted using the automatically-generated extraction rules.

As such, the instant disclosure provides a novel solution addressing the immediate demand for an automated system, application and/or platform that automatically generates extraction rules for use in automatically extracting data from electronic messages. According to some embodiments, the disclosed systems and methods first analyzes a corpus of electronic messages, e.g., email messages, and groups the messages into a number of clusters.

The disclosed systems and methods then, for a given cluster, select a number of messages belonging to the cluster. The disclosed systems and methods then sample data from the selected messages and use the sampled data to automatically generate a number of extraction rules. In accordance with one or more embodiments, automatic generation of an extraction rule comprises two phases: 1) basic rule creation; and 2) rule refinement. In basic rule creation, each XPATH is taken separately and the sample values for the XPATH across the messages are analyzed. A rule is generated that identifies each variable part of an XPATH. In addition, a general annotation is determined for each variable part. In the second phase, instead of a local XPATH view, connections between multiple XPATHs and/or cluster-wide connections can be considered. As annotations take context into consideration, annotations can be specifically tailored to a use case.

The disclosed systems and methods then apply one or more automatically-generated extractions rules to a new (e.g., newly-arriving) message to extract the variable data parts of the message. In accordance with one or more embodiments, the new message is assigned to one of the clusters. The automatically-generated extractions rules corresponding to the cluster are then used to extract the variable data items from the new message.

Examples of benefits derived from the disclosed systems and methods include: 1) the disclosed systems and methods provide a technologically based mechanism for automatic generation of extraction rules; and (2) the disclosed systems and methods can then use automatically-generated extraction rule(s) in extracting data from an electronic message. Thus, the disclosed systems and methods, for example, extract data from electronic messages in a fully automated manner that is predicated on an automatic generation of extraction rules.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, electronic messaging (e.g., email, text, etc.) servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
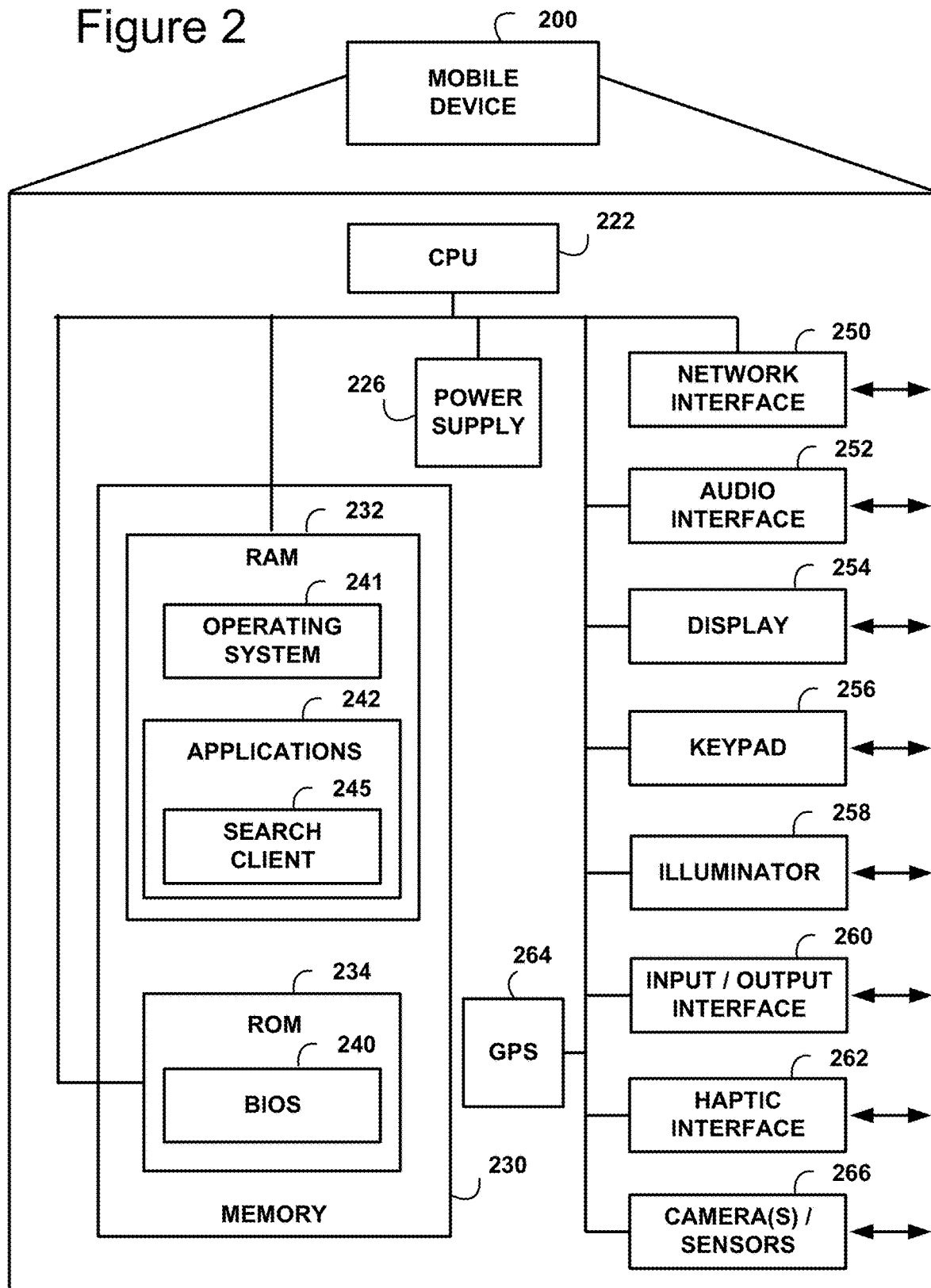
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
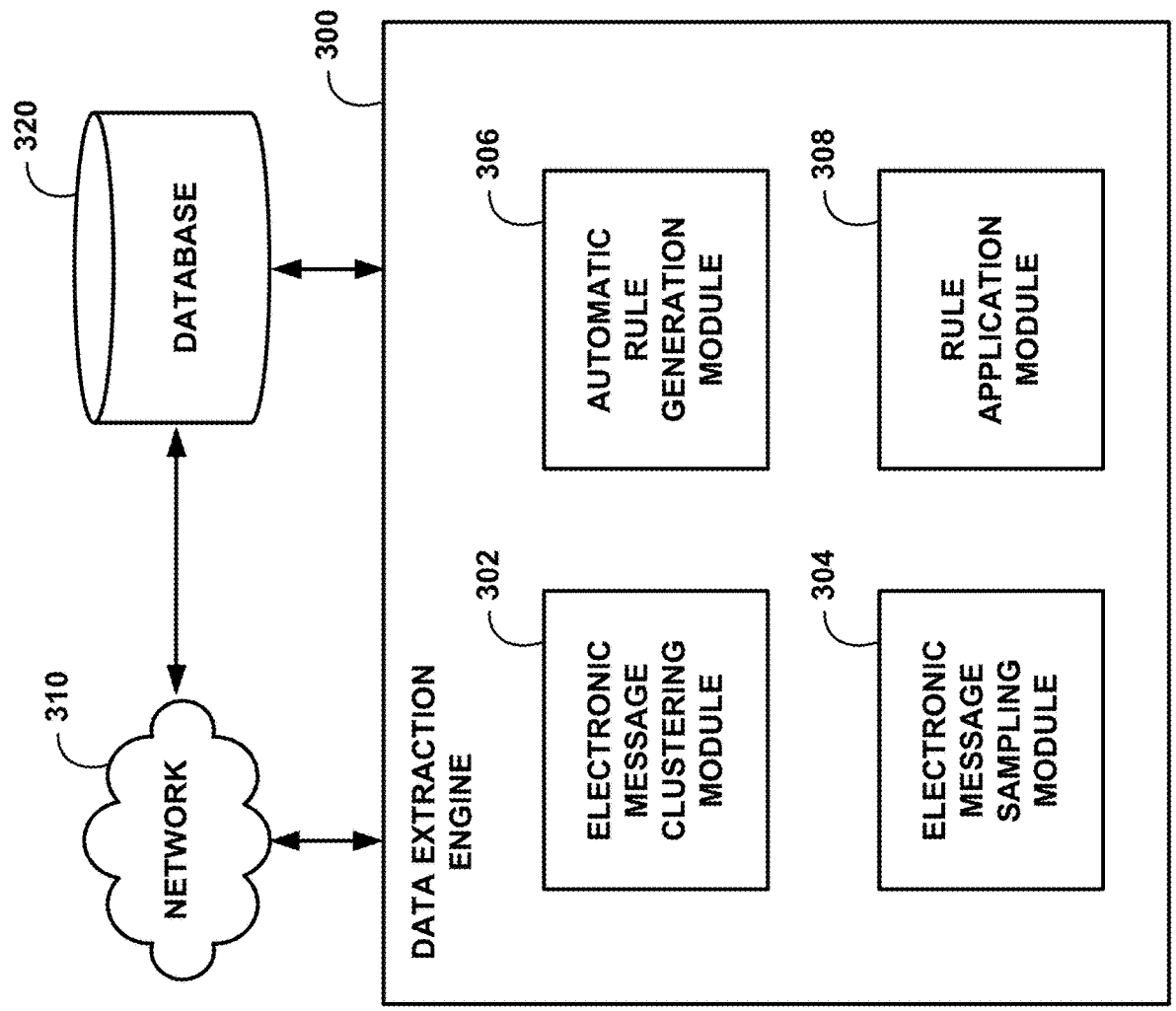
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a data extraction engine 300, network 310 and database 320. The engine 300 can be a special purpose machine or processor and could be hosted by an application server, content server, social networking server, web server, search server, content provider, email service provider, ad server, user's computing device, and the like, or any combination thereof.

According to some embodiments, engine 300 can be embodied as a stand-alone application that executes on a user device. In some embodiments, the engine 300 can function as an application installed on the user's device, and in some embodiments, such application can be a web-based application accessed by the user device over a network.

The database 320 can be any type of database or memory, and can be associated with a server on a network (such as and without limitation an electronic messaging server, search server, application server, etc.) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

Other user data can include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store electronic messages of one or more users, e.g., messages sent and/or received by one or more users, as well as data automatically extracted from one or more electronic messages. Database 320 can further store automatically-generated extraction rules. Each such extraction rule can be associated with a domain, e.g., united.com, and a Mail-Hash signature uniquely identifying a cluster of electronic messages from which the extraction rule is automatically generated. In addition, database 320 can store one or more annotation refinement model(s), annotation refinement model training data set(s), cluster identification information (e.g., corresponding domain name and digital signature information), electronic messages, XPATH expressions, XPATH values, etc.

The network 310 can be any type of network such as, but not limited to, a wireless network, a local area network (LAN), wide area network (WAN), the Internet, or a combination thereof. The network 310 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes electronic message clustering module 302, electronic message sampling module 304, automatic rule generation (or creation) module 306, and rule application module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information during or responsive to extraction rule creation and data extraction, as discussed in more detail below.

Figure 4:
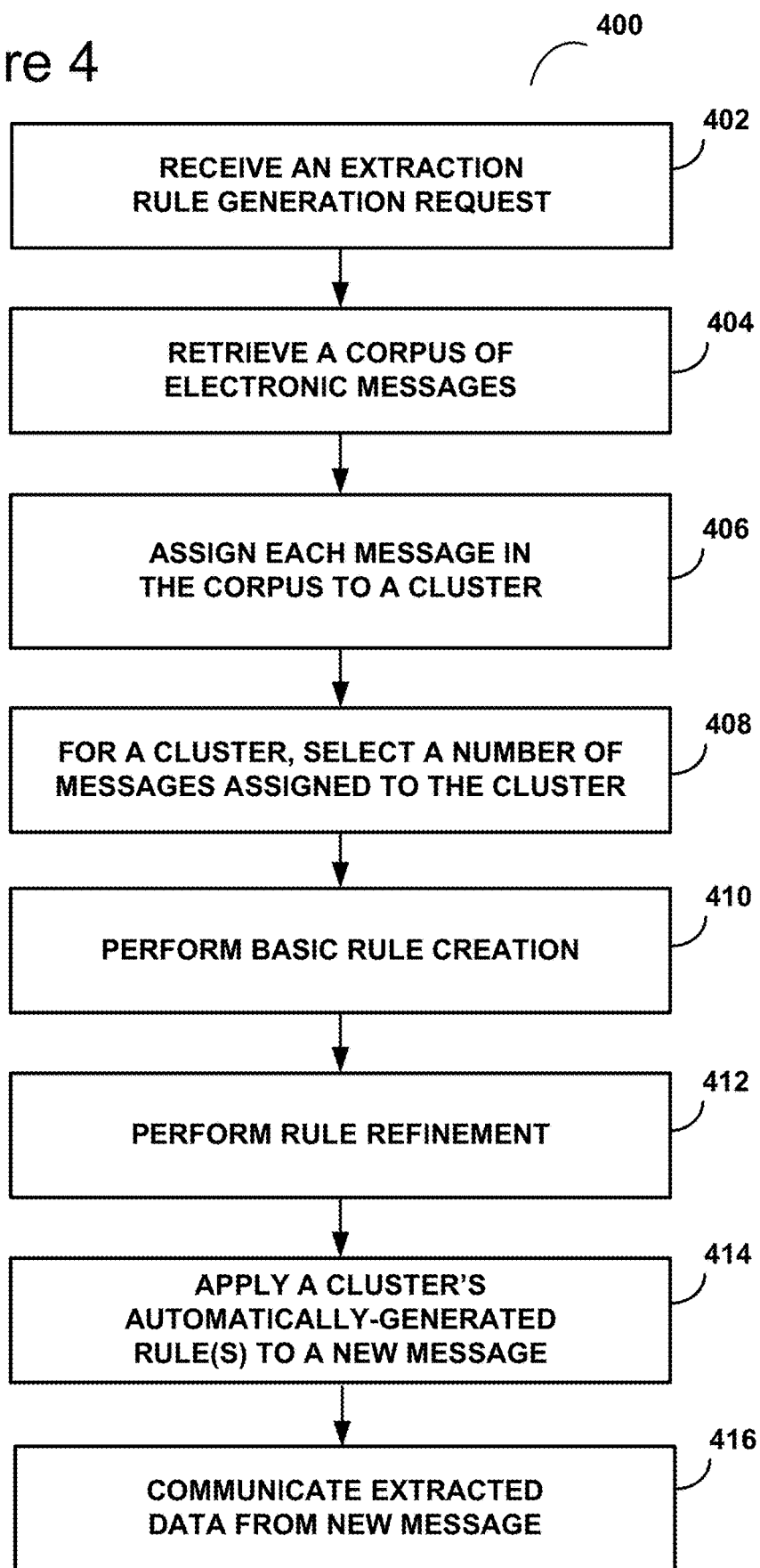
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically generating a data extraction rule and then using the automatically-generating data extraction rule for extracting data from an electronic message.

According to some embodiments, as discussed herein with relation to FIG. 4, the process involves automatically generating a number of extraction rules for a cluster of electronic messages from a same sender (e.g., same sender domain) determined to have a same structure. Such a process involves assigning electronic messages, some number of electronic messages of a corpus of electronic messages, to clusters, sampling at least some of the electronic messages assigned to a cluster, automatically generating a number of extraction rules for the cluster using values from the sampling of electronic messages and applying some or all of the number of extraction rules to a new electronic message determined to share the sender's domain and the structure of the electronic messages assigned to the cluster, as discussed in more detail below. In a case of a new electronic message, the new electronic message's mail-hash signature determines the cluster to which the new message belongs. If the cluster to which the new electronic message belongs is new (such that there is no extraction rule for the cluster), the new electronic message can be added to the sample of electronic messages used for generating the number of extractions rules for the cluster.

At step 402, a request is received by engine 300 to automatically generate one or more extraction rules. At step 404, a corpus of electronic messages is retrieved by engine 300. The request (received at step 402) can include information for identifying a corpus of electronic messages for use in automatically generating the data extraction rules. The corpus can be retrieved using the information identified in the request received at step 402. In any case, the corpus can comprise electronic messages, e.g., email messages, collected over a number of days, which may or may not be consecutive days.

Figure 5:
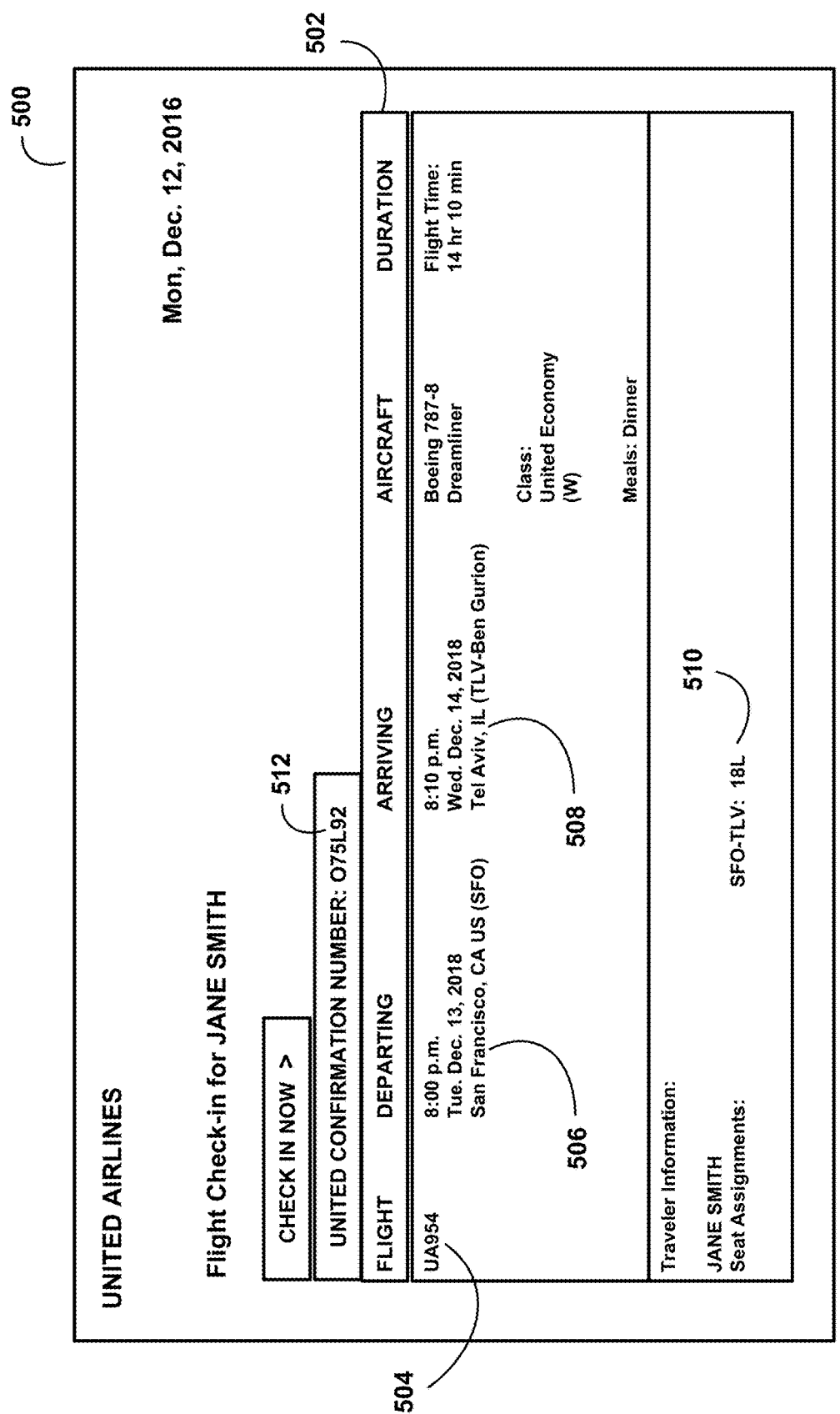

FIG. 5 provides an exemplary example of a display of an electronic message (e.g., an email message) in a corpus of electronic messages retrieved by engine 300 in accordance with one or more embodiments of the present disclosure. The display 500 is displaying a machine-generated electronic message providing flight itinerary information sent by an entity, in this case united airlines. The sender (or originator of the electronic message) includes an associated domain name, e.g., united.com, which identifies sender, or originator, of the email. The electronic message displayed in FIG. 5 provides an example of a machine-generated electronic message automatically generated using a script, such that flight itinerary electronic messages generated using the script have common, or shared, data as well as variable data. For example, the data in row 502 of the email is common data, while data 504, 506, 508, 510 and 512 each provide an example of variable data, which can vary across the electronic messages generated using the script.

In accordance with one or more embodiments, an electronic message such as that shown in display 500 can be represented using a markup language, such as XML, HTML, etc. For example, display 500 can be generated from an XML document, which has an associated DOM tree representing the components, e.g., markup language components, of the electronic message. In accordance with some embodiments, portions of the DOM tree representing an electronic message are used to generate a digital signature for the electronic message.

Figure 6:
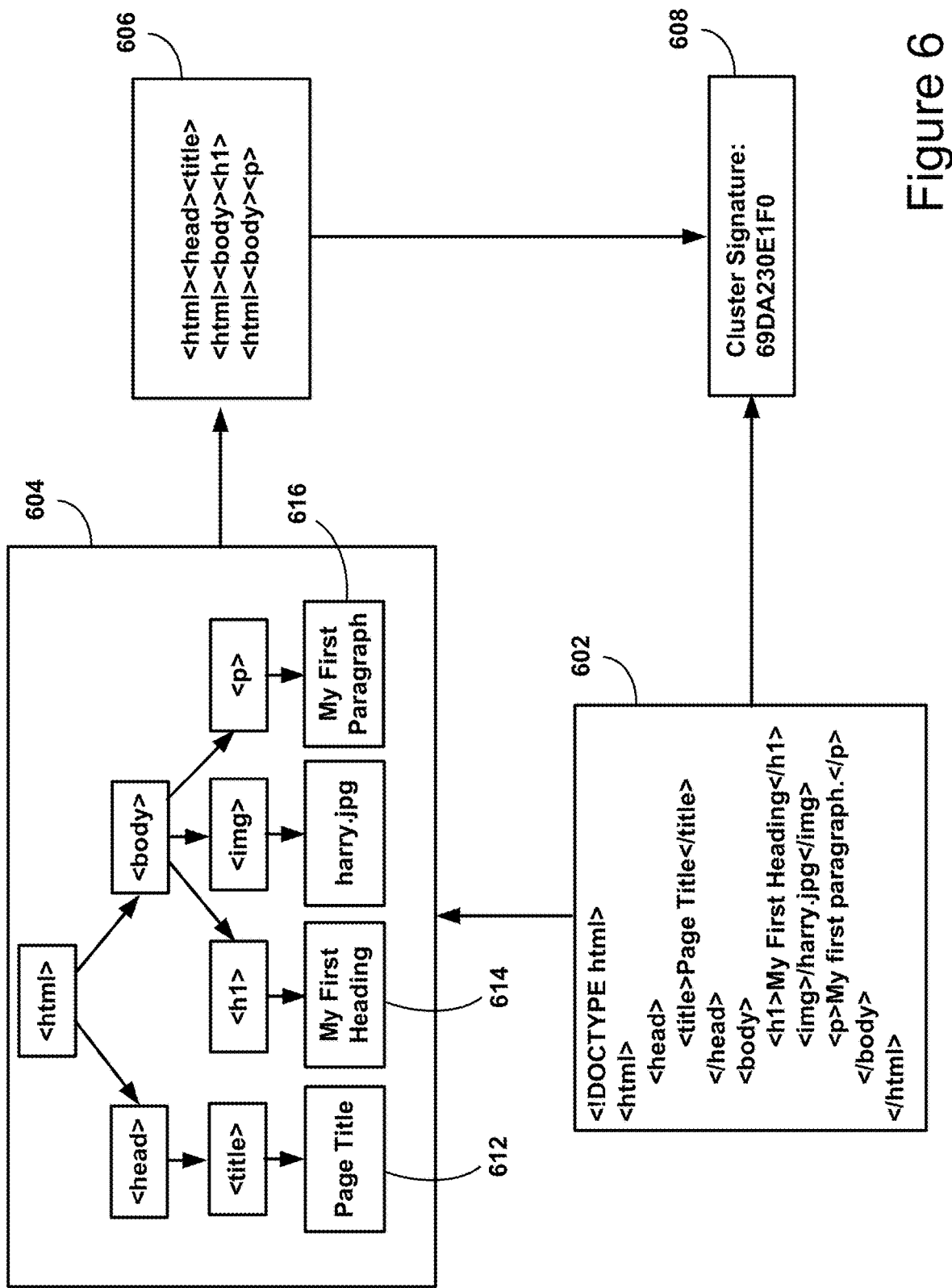

FIG. 6 provides an exemplary example of the HTML contents (which could correspond to at least a portion of an electronic message) and a corresponding DOM tree in accordance with one or more embodiments of the present disclosure. The HTML 602 can be represented as DOM tree 604. In the example, the DOM tree 604 includes a number of nodes, each of which corresponds to an HTML element in HTML 602. The DOM tree 604 further includes a number of edges that represent the hierarchy of the elements in HTML 602. In the example, nodes 612, 614 and 616 are leaves of the DOM tree 604, and more particularly, are textual leaves of the DOM tree 604.

Referring again to FIG. 5, a DOM tree representing the electronic message shown in the display 500 comprises textual nodes, or leaves, corresponding to the text in row 502 and the data 504, 506, 508, 510 and 512, for example.

With reference to FIG. 6, HTML 602 can be represented as an ordered list of XPATH expressions (or XPATHs) that lead to textual leaves in the DOM tree 604. An XPATH expression can be used in navigating through elements and attributes in an XML (or other markup language) document. An XPATH expression can be used to select a portion of an XML document, e.g., text, or other value, associated with a textual leaf of a DOM tree. Thus, each XPATH expression in an ordered list of expressions representing an electronic message can be used to extract a portion of the electronic message. Set 606 comprises the XPATH expressions for use in extracting the text associated with the textual leaves 612, 614 and 616 of DOM tree 604. The first XPATH expression in set 606 corresponds to textual leaf 612, the second XPATH expression corresponds to textual leaf 614 and the third to textual leaf 616.

In accordance with one or more embodiments, the XPATH expressions (or XPATHs) 606 corresponding to the textual leaf nodes in a DOM tree (such as DOM tree 604) are used to generate a digital signature, referred to herein as a Mail-Hash signature. In accordance with one or more embodiments, the Mail-Hash signature can be generated by taking the lower 64-bits of a digital signature (e.g., a digital value generated using an MD5 message-digest algorithm, or other hashing algorithm) computed over the XPATH expressions 606.

The digital signature for cluster signature 608, which in the example is 69DA230E1F0, is generated using a hashing algorithm and XPATH expressions 606. In the example of FIG. 6, the ordered list of XPATHs 606 corresponding to the textual leaves 612, 614 and 616 in DOM tree 604 can be concatenated to form a string, to which a hashing algorithm is applied to generate a Mail-Hash signature for HTML 602 (which can correspond to an electronic message). Each electronic message automatically generated by a common (or same) domain (representing an entity, such as United Airlines) using a common (or same) script has the same XPATH expressions 606 and consequently the same Mail-Hash signature, cluster signature 608, generated using the XPATH expressions 606. Reference is made to the article by Dotan Di Castro, et al., entitled "Enforcing k-anonymity in Web Mail Auditing" Proceedings of the Ninth ACM International Conference of Web Search and Data Mining, p. 327-336, February 22-25, 2016, San Francisco, Calif., which is incorporated herein by reference.

Referring again to FIG. 4, at step 406 (which is performed by electronic message clustering module 302), each electronic message in the corpus retrieved (at step 404) is assigned to a cluster using each electronic message's Mail-Hash signature. Thus, each electronic message belonging to a certain cluster has a common set of XPATHs (e.g., XPATH expressions 606) and a common domain. In accordance with at least one embodiment, each cluster is characterized by the shared domain and XPATHs.

At step 408 (which is performed by electronic message sampling module 304), a number of messages assigned to a certain cluster are selected. The number can be any size (or number) of electronic messages, such as and without limitation several dozens, of messages. The number can be any threshold number determined to allow effective identification (with precision) of variable data in the messages. In some embodiments, the data sampled from each message selected from a cluster can be represented in a table (or some tabular format), where each row corresponds to a selected message and each column (or other delineation) corresponds to an XPATH expression. An XPATH can be a constant XPATH or a variable XPATH. In the case of a constant XPATH expression, the value corresponding to the XPATH is the same across all of the electronic messages. In the case of a variable XPATH expression, at least a portion of the value corresponding to the XPATH varies for at least some of the electronic messages. A variable XPATH can be include both a constant portion and variable portion, such that at least some portion of the value is the same across the electronic messages and at least some portion of the value varies across the electronic messages.

FIG. 7 provides an exemplary example of a table, in accordance with one or more embodiments of the present disclosure, comprising a number of rows, each of which corresponds to one electronic message (e.g., one of the electronic messages selected at step 408 of FIG. 4), and a number of columns, each of which corresponds to an XPATH. In the example of FIG. 7, table 700 comprises columns 702, 704, 706, 708, 710, 712, 714 and 716 and rows 720, 722, 724, 726, 728 and 730. In the example of FIG. 7, each row corresponds to one electronic message and each column corresponds to an XPATH expression, e.g. an) (PATH expression from set 606. Each value (at the intersection of a row and a column) comprises a value from one of the electronic messages and corresponding to one of the XPATH expressions. In the example, it is clear that at least $XPATH_1$, $XPATH_4$, and $XPATH_7$ are variable, since at least a portion of the value varies across at least some of the electronic messages. In the case of)(PATH', the value is both constant and variable, such that at least a portion of the value is the same across the electronic messages and at least another portion of the value varies across the electronic messages. In the case of and $XPATH_4$ and $XPATH_7$, the entire value varies across the electronic messages.

Referring again to FIG. 4, at step 410 (which is performed by automatic rule generation module 306), basic rule creation is performed using values such as those shown in table 700 of FIG. 7. In accordance with one or more embodiments, in basic rule creation, each) (PATH is taken separately and the sample values (e.g., the sample values in rows 720, 722, 724, 726, 728 and 730 of table 700) for an XPATH ($XPATH_1$ corresponding to row 702 of table 700) across the electronic messages (or rows 720, 722, 724, 726, 728 and 730 of table 700 corresponding to the electronic messages) are analyzed. The analysis results in a rule being generated that identifies each variable part of an)(PATH using an annotation. In step 410 (which is a first phase that involves basic rule creation), a general annotation is determined for each variable part. For example, a general annotation might identify a variable part as a name, an airport code, a date, etc.

With reference to FIG. 7 (in step 410 of FIG. 4), the values (in rows 720, 722, 724, 726, 728 and 730 of table 700) for $XPATH_1$ are compared in order to identify each portion that is constant (e.g., "Thank you" and "!") and each portion that varies (e.g., the portion between "Thank you" and "!") from one electronic message to another electronic message. In accordance with one or more embodiments, at least a portion (e.g., the variable portion) of each value can be analyzed to identify a first level, or general, classification of the data for annotating the variable data. For example, one or more of the names (e.g., "John", "Arya", etc.) can be used as a search query in a number of dictionaries (including a name dictionary), and once found in the name dictionary, a "Name" annotation can be applied to the variable portion of)(PATH'.

FIG. 8 provides exemplary examples of mechanisms for use in annotation performed in phase one in accordance with one or more embodiments of the disclosure. The example of FIG. 8 includes a number of dictionary examples that can be queried in order to locate and classify a variable data value. An address dictionary can be used with a data value to identify a value as an address value, e.g., house number, street, city, state, country, etc. A dictionary of airport codes can be searched using a variable data value (or values) to determine whether a variable portion of an)(PATH is an airport code. Other dictionaries, including place, point of interest, product, etc. dictionaries, can also be used. Alternatively, or in addition to using one or more dictionaries, pattern recognition can be used in order to recognize a pattern of the variable data, and thereby identify and annotate the variable data. Examples of patterns that can be recognized include date, time, mail address, currency, number, universal resource locator (URL) patterns. It should be apparent that any dictionary or pattern recognition can be used with embodiments of the present disclosure.

Figure 9:
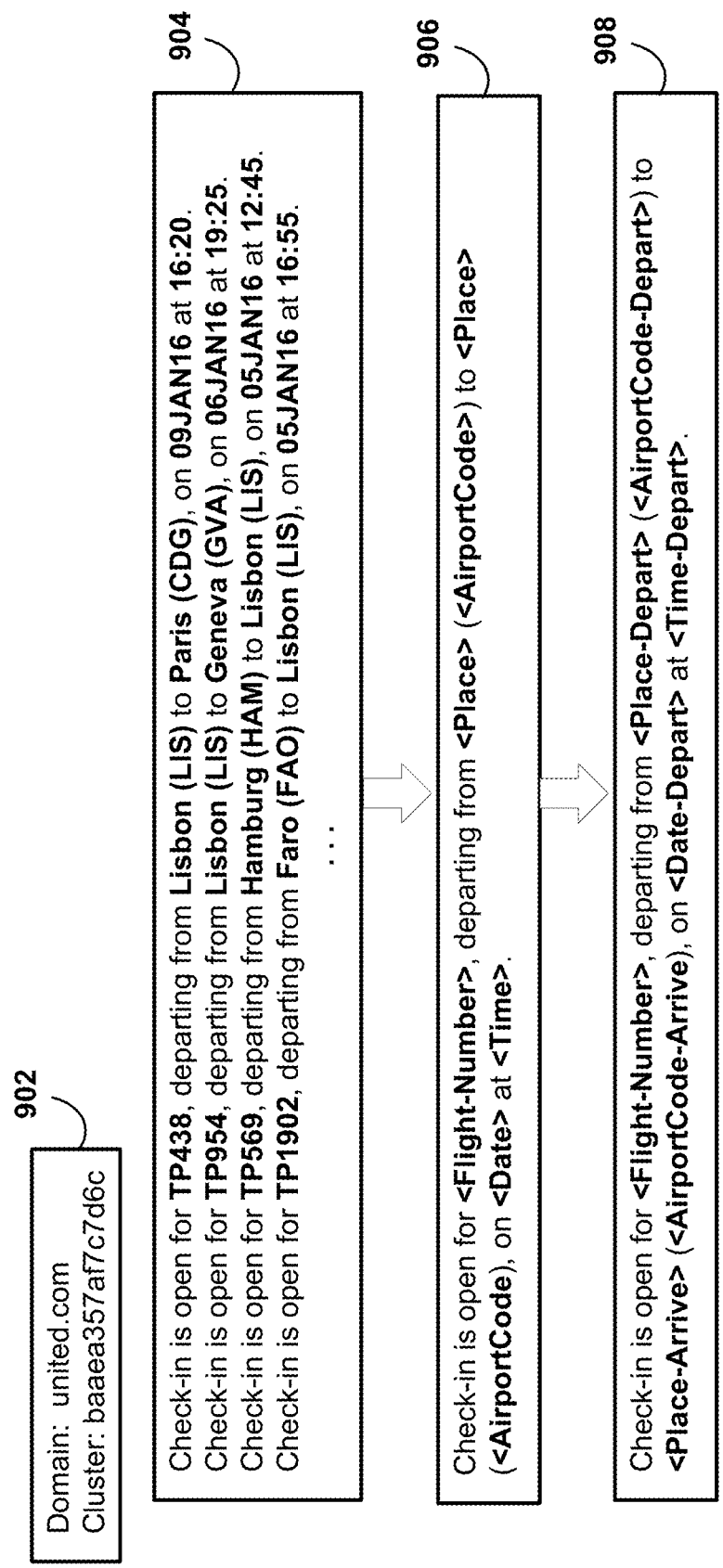

FIG. 9 provides an exemplary example of values corresponding to an)(PATH expression and associated automatic rule generation in accordance with one or more embodiments. The example of FIG. 9 shows one)(PATH with a number of annotations in the) (PATH. In the example, block 904 shows values corresponding to the single)(PATH corresponding to a number of electronic messages belonging to a certain cluster, e.g., a cluster corresponding to the "united.com" domain and a digital signature value (e.g., Mail-Hash value) of "baaea357af7c7d6c" shown in block 902.

In the first phase (which is performed at step 410 of FIG. 4), extraction rule 906 is automatically-generated using the values from block 904. Extraction rule 906 includes the constant portions of the values from block 904 and identifies the variable parts of the)(PATH. In step 410, each variable part is identified, and an initial annotation (also referred to herein as a light annotation) is determined for the variable part (e.g., using a number of dictionaries and/or a number of pattern recognizers).

In accordance with one or more embodiments, in step 410 (the first phase), the sample values for the XPATH across the messages are analyzed in determining a variable part's annotation. As discussed, the one or more values associated with a variable part of an XPATH can be used as a search query to search one or more dictionaries. In accordance with one or more embodiments, if a threshold confidence level is satisfied (such as and without limitation a threshold percentage, such as without limitation 80%, a threshold number, etc., of the variable values are found in a given dictionary), the variable values are considered to be representative values of the annotation associated with the dictionary. In such a case, the annotation associated with the dictionary can be used as the initial annotation assigned to the variable part of the XPATH in step 410.

For example, the <Place> annotation can be determined by searching a dictionary of places for the variable values "Lisbon", "Geneva", etc., and if a threshold confidence level is satisfied (e.g., a threshold percentage, threshold number, etc. of the variable values are found in the dictionary of places), a place annotation can be used for the variable values. By way of a further non-limiting example, the <AirportCode> annotation can be determined by searching a dictionary of airport codes (e.g., to find the values "LIS", "GVA", etc.) to determine that the threshold confidence level is satisfied. As yet another example, the <FlightNumber> annotation can be ascertained by searching a database of flights.

In step 410, a number of automated pattern recognizers can perform pattern recognition analysis on one or more values corresponding to a variable part of an XPATH. For example a value comprising a date can be analyzed using an automated pattern recognizer to determine that the value is a date and an annotation (e.g., <Date>) associated with the pattern recognizer can be used to annotate the variable part of the XPATH. The pattern recognizer can be used to detect a pattern using on one or more of the values "09JAN16", "05JAN16, etc. from block 904 By way of a further non-limiting example, the <Time> annotation can be determined using an automated pattern recognizer with one or more of the time values, e.g., "16:20", "19:25" etc. from block 904.

In the second phase (which is performed at step 412 of FIG. 4, by automatic rule generation module 306), a data extraction rule (e.g., data extraction rule 906 of FIG. 9) can be refined to include a more specific, or precise, annotation in place of an initial annotation assigned to a variable part of an)(PATH in step 410. The refined annotation (determined in step 412) provides greater contextual meaning (than the initial annotation assigned in step 410), such as whether an airport code is a departure airport code or an arrival airport code. In step 410, a determination can be made that a variable part of an)(PATH is an airport code. While the analysis performed in step 410 provides some context for a variable part of an)(PATH, the analysis performed in step 412 augments the analysis performed in step 410 and provides a fuller context for a variable part. For example, in step 412, a determination can be made whether an airport code value determined in step 410 is a departure airport code value or an arrival airport value in a flight itinerary.

In accordance with at least one embodiment, context can be determined using signals contained in an)(PATH. For example, in block 904 of FIG. 9, the "departing from" (before the first <Place> annotation), "on" (before the <Date> annotation) and "at" (before the <Time> annotation), which are from one)(PATH, can be used to determine that the first <Place> annotation, the first <AirportCode> annotation, the <Date> annotation and the <Time> annotation each refer to a departure. By way of a further non-limiting example, the "to" (before the second <Place> annotation) can be used to determine that the second <Place> annotation and the second <AirportCode> annotation refer to an arrival. In addition, once an initial annotation is replaced with a more precise annotation, the replacement annotation can be used in refining another initial annotation. For example, using the <Place> annotations as an example, the determination to replace the first <Place> annotation (in data extraction rule 906) with the more precise <PlaceDepart> annotation provides further indication that the second <Place> annotation is to be replaced with <PlaceArrive>.

In accordance with one or more embodiments, in step 412, annotation refinement analysis can consider connections between multiple XPATHs and/or cluster-wide connections. In the example of FIG. 9, the)(PATH included the contextual signals, such as "departing from" and the like. However, such contextual signals may be determined from multiple) (PATHS. Assume for the sake of example that a separate, constant)(PATH contained table headings such as "Depart" and "Arrive". The contextual signals contained in the table headings XPATH can be used to refine the annotations, particularly in a case in which an XPATH (unlike the one shown in FIG. 9) did not include the contextual signals (e.g., "departing from", etc. in the example XPATH in FIG. 9).

In accordance with one or more embodiments, annotations can be specifically tailored to each use case (e.g., a category identified using a trained classifier), each use case can provide context and have associated annotations, which can differ from another use case's context and annotations. For example, annotations for an electronic message with flight information would be different than annotations used for purchase order/receipts. As yet further illustrative examples, a date in an itinerary message may represent a departure or arrival date, while it may represent an expected delivery date in a shipping notification message.

Some non-limiting examples of such use-case classifications (or categories) include: purchases, finance, travel, services, events and marketing. Purchases include without limitation notifications related to online purchases, such as receipts and shipping notifications. Finance refers to financial activities such as transactions related to stocks, credit cards, banking, and more. Travel includes all activities related to travel, such as and without limitation flights, car rentals, hotel reservations and other trip rentals. Services includes such things as periodic payments to service providers such as and without limitation phone, cables, and Internet companies. Events include without limitation reservations, receipts and subscriptions related to events such as and without limitation restaurant reservations, sporting events, beauty and health appointments, etc. Marketing refers to such things as promoted products and similar content, which could be either general or personalized with respect to the user. Reference is made to the article by Noa Avigdor-Elgrabli, et al., entitled "Structural Clustering of Machine-Generated Mail", Proceedings of the 25$^{th}$ ACM International Conference on Information and Knowledge Management, p. 217-226, Oct. 24-28, 2016, Indianapolis, Ind., which is incorporated herein by reference.

In the example shown in FIG. 9, the electronic messages belonging to the cluster fall within the travel category, and more particularly within a flight (or air) travel category. A set of applicable annotations associated with the flight (or air) travel category (e.g., <Flight-Number>, <Place-Depart>, <AirportCode-Depart>, <Place-Arrive>, <AirportCode-Arrive>, <Date-Arrive>, <Date-Depart>, <Time-Arrive>, <Time-Depart>, etc.) can be used to select from in refining the annotations in step 412, and other inapplicable annotations associated with other, different categories (e.g., annotations applicable to purchases, finance, etc.) can be ignored in determining the refined annotations in step 412.

In accordance with one or more embodiments, the annotation refinement analysis performed at step 412 uses an annotation refinement model in determining a refinement for a light (or initial) annotation. In accordance with the one or more embodiments, an annotation refinement model can be trained for each light (or initial) annotation (e.g., Date, Name, AirportCode, etc.) in each category (e.g., Travel, Coupons, Events, etc.). A light annotation's annotation refinement model can be used in identifying an appropriate refinement given the cluster's category. The training data used in training the annotation refinement model, for a given light annotation, is generated across the cluster and the XPATHs in the cluster. Each training example of the training data comprises a set of features and corresponding values. Some non-limiting examples of features that can be used to train an annotation refinement model for a given light annotation include without limitation the light annotation's relative XPATH position, annotations before and after the light annotation, constant values before and after the light annotation, HTML headers associated with the light annotation and HTML tag attributes associated with the light annotation. In accordance with one or more embodiments, an annotation refinement model (e.g., a classifier) is trained, using machine learning.

To illustrate in connection with at least one embodiment, for a given light annotation (an annotation determined in step 410) associated with a variable value of an XPATH expression in a set of XPATH expressions associated with a cluster belonging to a category (or class), training data is generated across the set of XPATH expressions associated with the cluster. The training data generated for use in training the annotation refinement model for the light annotation comprises a number of training examples, each of the training examples comprises a set of features (e.g., relative XPATH position, annotations before and after the light annotation, constant values before and after the light annotation, etc.). Using machine learning, the annotation refinement model is trained for use in determining a refinement for the light annotation.

A set of feature values (e.g., relative XPATH position value(s), annotations before and after the light annotation, constant values before and after the light annotation, etc.) is generated for the light annotation and used as input to the trained annotation refinement model. The annotation refinement model generates output (e.g., a set of probabilities for each refinement associated with the cluster's class, or category) indicating the refinement that is to be used to refine the light annotation. For example and in the case that the output of the annotation refinement model is a set of probabilities with each probability of the set corresponding to a refinement for the light annotation, the refinement that is selected to replace the light annotation can have the highest probability relative to the probabilities associated with other refinement options.

In the example of FIG. 9, an annotation refinement model can be associated with each light annotation shown in extraction rule 906. For a given light annotation, the associated annotation refinement model is used with feature input associated with a given light annotation to identify a refinement for the given light annotation in block 906. For example, the <Place-Depart> refinement (or refined annotation) can be determined using the associated annotation refinement model (e.g., the <Place> annotation refinement model for the flight (or air) travel category) and feature input associated with the first <Place> light annotation, and the <Place-Arrive> refinement (or refined annotation) can be determined using the <Place> annotation refinement model and feature input associated with the second occurrence of the <Place> light annotation in extraction rule 906. In a similar manner, the <AirportCode> light (or initial) annotations assigned at step 410 can be replaced with the <AirportCode-Depart> and <AirportCode-Arrive> refinement annotations in step 412, and the <Date> and <Time> annotations assigned in step 410 can be replaced with <Date-Depart> and <Time-Depart>.

Extraction rule 908 provides an exemplary example of an extraction rule (automatically generated in step 412), which is a refinement of the data extraction rule 906 (automatically generated in step 410). In the example, each of the <Place> annotations is refined to reflect either the place of departure (e.g., <Place-Depart>) or the place of arrival (e.g., <Place-Arrive), each of the <AirportCode> annotations is refined to reflect the departure airport (e.g., <AirportCode-Depart>) and the arrival airport (e.g., <AirportCode-Arrive), and the <date> and <time> annotations are refined to reflect that each refers to a departure (e.g., <Date-Depart> and <Time-Depart>), rather than an arrival.

In accordance with one or more embodiments, an extraction rule (e.g., extraction rule 908) comprises a procedure for extracting each variable value in the XPATH expression. The procedure can be used to identify and trim the constant portion(s) from the value yielding the variable portion of the value.

As discussed, a cluster of electronic messages (e.g., cluster "baaea357af7c7d6c" identified in block 902) can be associated with a certain category, e.g., a flight (or air) travel category. Based on this category, annotations not related to flight (or air) travel can be eliminated from consideration, and the focus can be placed on flight (or air) travel annotations. In step 412 (which performs a second phase of analysis), instead of a local XPATH view (which is used in the first phase performed at step 410), connections between multiple XPATHs and/or cluster-wide connections can be considered. In the second phase, context across the cluster (and the set of XPATHs in the cluster) can be used in determining a refinement for a light annotation identified in the first phase (at step 410). For a given light annotation (determined at step 410), context can be considered using a machine-trained annotation refinement model and feature input (e.g., relative XPATH position associated with the light annotation, annotations before and/or after the light annotation, constant values before and/or after the light annotation, etc.) associated with the light annotation. Using the machine-trained annotation refinement model and the feature input determined for the light annotation, a refined annotation (or refinement) can be determined for the light (or initial) annotation.

Referring again to FIG. 4, at step 414 (which is performed by rule application module 308), one or more automatically-generated data extraction rules can be applied to an electronic message. For example, the automatically-generated data extraction rule(s) can be applied as an electronic message is received at a message server or at a user computing device. As yet another non-limiting example, the extraction process can be performed periodically (e.g., one a day, every hour, etc.).

In accordance with one or more embodiments, step 414 is performed online while steps 404, 406, 408, 410 and 412 are performed offline. In the example of FIG. 4, steps 404, 406, 408, 410 and 412 can be performed in response to a request received at step 402. Alternatively, steps 404, 406, 408, 410 and 412 can be performed periodically (e.g., offline), such as one a day (at night), once a month, etc. Steps 404, 406, 408, 410 and 412 can be repeated periodically to update (e.g., change or generate new) clusters and corresponding extraction rules.

Figure 10:
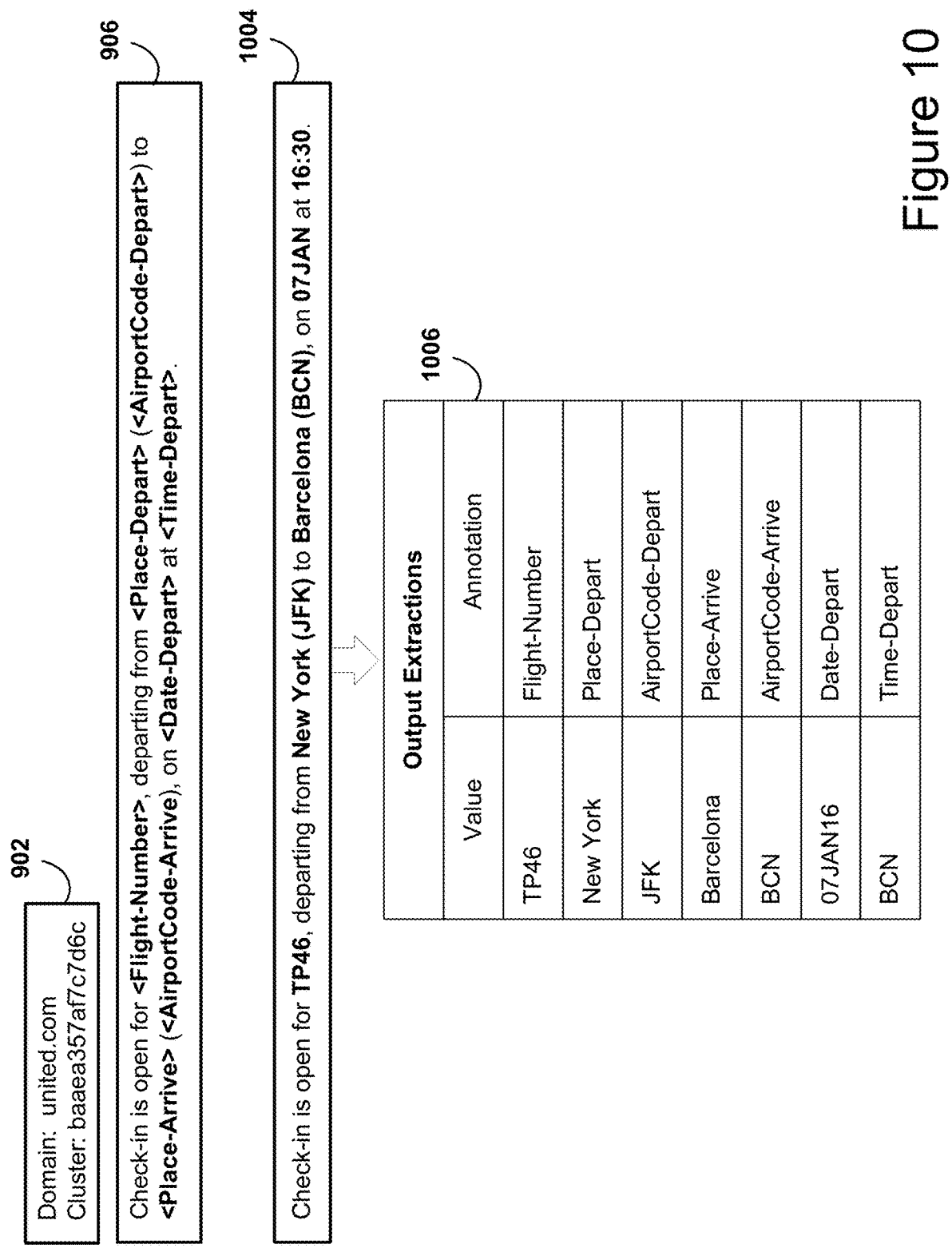

FIG. 10 provides an exemplary example of an automatic extraction using an automatically-generated extraction rule (e.g., extraction rule 906) in accordance with one or more embodiments of the present disclosure. First, a determination is made that the new electronic message belongs to the same cluster from which extraction rule 906 is generated. In order to determine that the new electronic message belongs to the cluster, a Mail-Hash signature is generated for the electronic message using the XPATH expression(s) (from the DOM tree representing the electronic message) that lead to textual leaves in the DOM tree. The examples of FIGS. 9 and 10 involve a single XPATH expression. However, it should be apparent that multiple XPATH expressions can be involved. In the examples of FIGS. 9 and 10, the new electronic message's Mail-Hash signature is compared to the cluster's Mail-Hash signature (e.g., "baaea357af7cd6c") to determine that there is a match between the new electronic message's Mail-Hash signature and the cluster's Mail-Hash signature. In addition, a check is made to determine that the new electronic message shares the same sender's domain as the cluster.

Once a match is found between the new electronic message's domain and Mail-Hash signature and a cluster's domain and Mail-Hash signature, each extraction rule automatically generated for the cluster can be used to automatically extract data from the new electronic message. In the example of FIG. 10, automatically-generated extraction rule 906 associated with the cluster identified by the information in block 902 (e.g., domain and Mail-Hash signature) is used to extract data from the XPATH expression in block 1004.

For example, the variable data from the XPATH leading to a textual leaf (from the electronic message's DOM tree) can be extracted and associated with the corresponding annotation. By way of a further non-limiting example, "TP46" is extracted and associated with the <Flight-Number> annotation associated with the first XPATH. A similar approach is used for each variable value in the XPATH. Table 1006 provides a listing of the data automatically extracted from the XPATH expression of the new electronic message. Each data item is associated with an annotation (corresponding to the respective XPATH) in table 1006.

Figure 11:
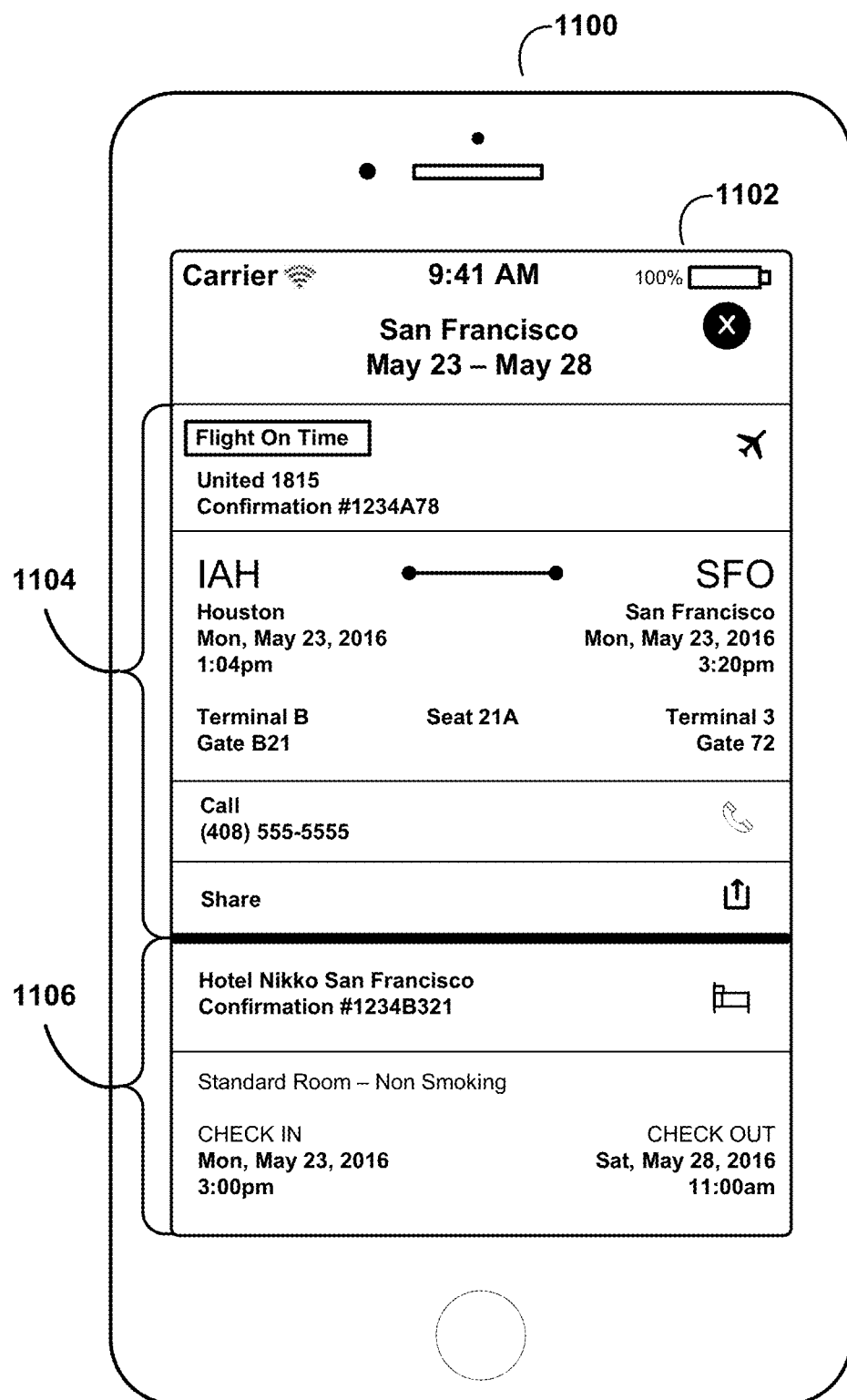

Referring again to FIG. 4, at step 416, in accordance with one or more embodiments, data automatically extracted from an electronic message is communicated to a user computing device. FIG. 11 provides an example of a travel assistant client application's display at a user computing device, which provides a display of data automatically extracted from a number of electronic messages using automatically-generated data extraction rules in accordance with one or more embodiments of the present disclosure.

In the example of FIG. 11, display 1102 of user device 1100 displays (in display area 1104) flight information and (in display area 1106) hotel reservation information automatically extracted from a number of electronic messages using a number of automatically-generated data extraction rules. The data displayed in each of display areas 1104 and 1106 comprises data automatically extracted from at least one electronic message using at least one automatically-generated extraction rule.

In the example, the data displayed in display area 1104 is extracted from at least one electronic message belonging to the flight (or air) travel cluster for a given domain (e.g., united.com). For each such electronic message, data is automatically extracted using at least one data extraction rule automatically-generated for flight (or air) travel cluster associated with the domain (e.g., a united.com) and a cluster Mail-Hash signature matching the Mail-Hash signature automatically-determined for the electronic message. It should be apparent that the data displayed in display area 1104 can be extracted from more than one electronic message.

In addition, in the example of FIG. 11, the data displayed in display area 1106 is extracted from at least one electronic message belonging to the hotel reservation travel cluster for a given domain (e.g., hotelnikkosf.com). For each such electronic message, data is automatically extracted using at least one data extraction rule automatically-generated for the hotel reservation travel cluster associate with the domain (e.g., hotelnikkosf.com) and a cluster Mail-Hash signature matching the Mail-Hash signature automatically-determined for the electronic message. It should also be apparent that the data displayed in display area 1106 can be extracted from more than one electronic message.

In addition to a travel assistant application or system, embodiments of the present application can be used in connection with other computing systems, such as and without limitation online advertising systems, electronic message (e.g., electronic mail message) search systems, electronic message summarization systems, recommendation systems, all of which can use data automatically extracted from electronic messages using automatically-generated data extraction rules.

With reference to step 416 of FIG. 4, data automatically extracted using data extraction rules automatically generated in accordance with embodiments disclosed herein can be provided to an end user via one of these computing systems. Alternatively, data automatically extracted using data extraction rules automatically generated in accordance with embodiments disclosed herein can be provided to a computing system (such as without limitation one of the computing systems discussed above) for purposes of providing a service or generating other data for presentation to the end user.

In the case of an online advertising computing system, data automatically extracted from one or more electronic messages using automatically-generated data extraction rules can be used (e.g., as keywords and/or in determining user interest) by the online advertising computing system in selecting advertising content for a sender or recipient of the electronic messages.

In the case of an electronic message search computing system (or an electronic message search engine), data can be extracted from electronic messages and used to generate a search index associating the extracted data with the electronic messages from which data is extracted. The search index can then be used by the search system to search for and identify those electronic messages containing the indexed, extracted data.

In addition and as illustrated with the travel assistance display shown in FIG. 11, data extracted from a number of electronic messages can be displayed by a travel assistance system (either via a web browser or a travel assistant client application) in a summarization display by a computing system that summarizes electronic message content.

In the case of a computerized recommendation system, data automatically extracted from one or more electronic messages can be used by the recommendation system to infer one or more interests (as well as a level of interest), which can then be used to make content recommendations, social network (e.g., friend or group) recommendations, etc.

Figure 12:
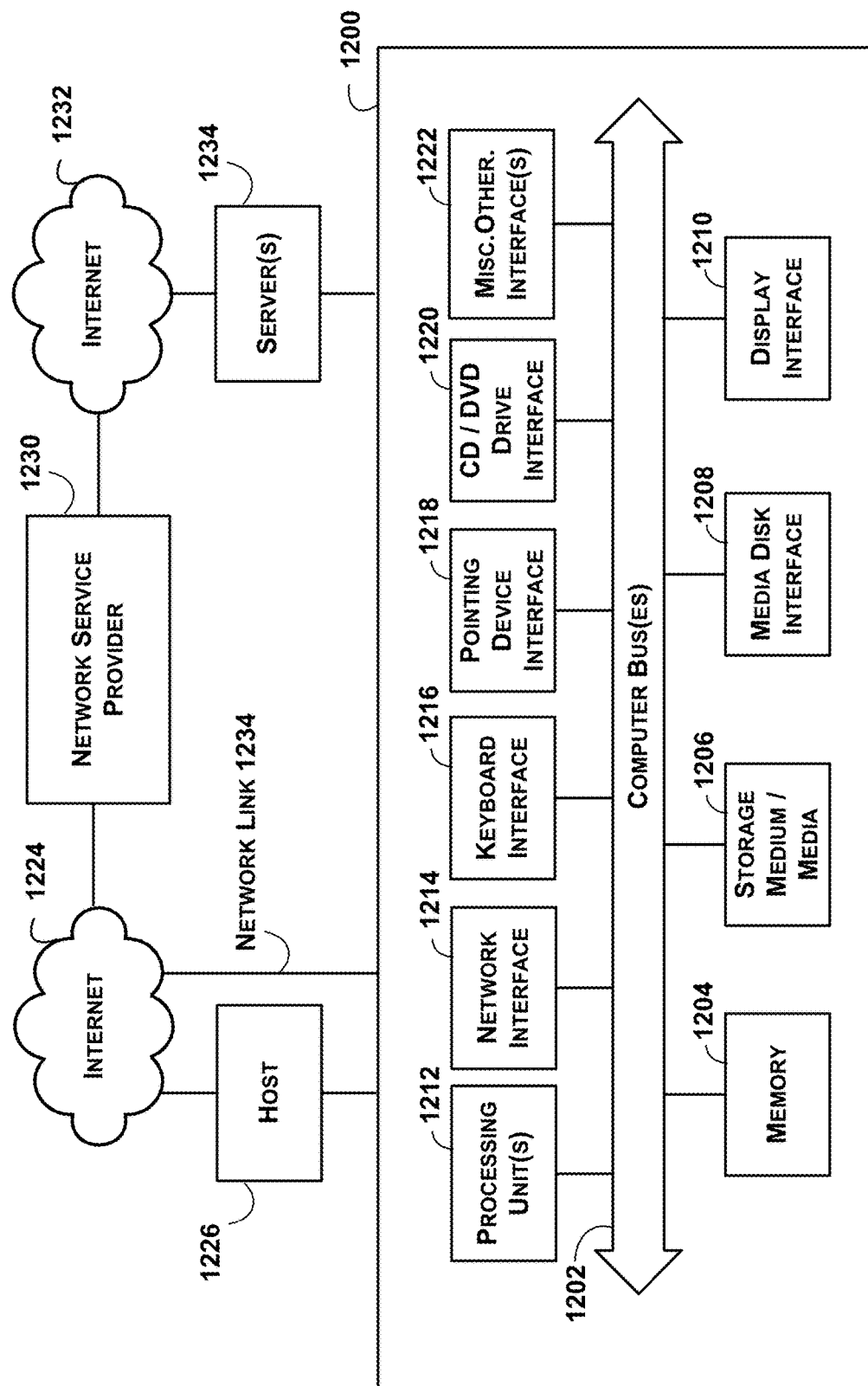
FIG. 12 is a block diagram illustrating the architecture of an exemplary hardware device in accordance with one or more embodiments of the present disclosure.

As shown in FIG. 12, internal architecture 1200 of a computing device(s), computing system, computing platform, user devices, set-top box, smart TV and the like includes one or more processing units, processors, or processing cores, (also referred to herein as CPUs) 1212, which interface with at least one computer bus 1202. Also interfacing with computer bus 1202 are computer-readable medium, or media, 1206, network interface 1214, memory 1204, e.g., random access memory (RAM), run-time transient memory, read only memory (ROM), media disk drive interface 1220 as an interface for a drive that can read and/or write to media including removable media such as floppy, CD-ROM, DVD, media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise program code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1228 typically provides information communication using transmission media through one or more networks to other devices that use or process the information. For example, network link 1228 may provide a connection through local network 1224 to a host computer 1226 or to equipment operated by a Network or Internet Service Provider (ISP) 1230. ISP equipment in turn provides data communication services through the public, worldwide packet-switching communication network of networks now commonly referred to as the Internet 1232.

A computer called a server host 1234 connected to the Internet 1232 hosts a process that provides a service in response to information received over the Internet 1232. For example, server host 1234 hosts a process that provides information representing video data for presentation at display 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and program code, may be read into memory 1204 from another computer-readable medium 1206 such as storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1202 as it is received, or may be stored in memory 1204 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
retrieving, via a computing device, a corpus of electronic messages, each electronic message of the corpus using an internal format comprising a plurality of expressions;
assigning, via the computing device, each electronic message of the corpus to one cluster of a plurality of clusters, a cluster of the plurality having an assigned set of electronic messages from the corpus of electronic messages, the cluster having an associated set of expressions shared by each electronic message in the assigned set;
identifying, via the computing device, a variable value in connection with a number of expressions in the set of expressions, the variable value indicating that at least a portion of a value corresponding to the number of expressions varies across the number of electronic messages;
analyzing, via the computing device, the variable value corresponding to multiple electronic messages of the number of electronic messages to determine an annotation;
automatically refining, via the computing device, the annotation, comprising:
using a value corresponding to at least one other expression of the set to determine a meaning of the variable value; and
using the meaning of the variable value to refine the annotation;
automatically generating, via the computing device and for the cluster, a data extraction rule comprising the annotation associated with each expression having the variable value;
automatically extracting, via the computing device and using the automatically-generated data extraction rule, data from another electronic message; and
communicating, via the computing device, at least some of the automatically extracted data to an entity.

2. The method of claim 1, communicating at least some of the automatically extracted data to an entity further comprising communicating at least some of the extracted data and associated annotations to a client application for display in an electronic message information summary display at a client device.

3. The method of claim 1, analyzing the variable value corresponding to multiple electronic messages to determine the annotation for the variable value further comprising:
for each electronic message of the multiple electronic messages, searching a dictionary, of a number of dictionaries, using at least a portion of the variable value from the electronic message as a query, each dictionary of the number having an associated annotation;
determining that the at least a portion of the variable value associated with the multiple messages is found in the dictionary, the determining further comprising determining that a threshold confidence level is satisfied; and using the associated annotation of the dictionary containing the at least a portion of the variable value as the annotation for the variable value.

4. The method of claim 1, analyzing the variable value corresponding to multiple electronic messages to determine the annotation further comprising:
determining, using at least one pattern recognition analyzer, a pattern of at least a portion of the variable; and
using an associated annotation of the pattern as the annotation for the variable value.

5. The method of claim 1, automatically refining further comprising using a set of annotations associated with the cluster.

6. The method of claim 1, automatically refining the annotation further comprising:
generating, via the computing device, training data across the set of expressions associated with the cluster, the training data comprising a plurality of training examples, each training example comprising a set of features and corresponding feature values;
training, via the computing device and using machine learning, an annotation refinement model for use in refining the annotation;
generating, via the computing device, a set of features for the annotation; and
the refining further comprising using the annotation refinement model trained with the set of features generated for the annotation to refine the annotation associated with the expression.

7. The method of claim 1, automatically extracting data from the other electronic message further comprising, for an expression of the number:
using the expression to retrieve the corresponding value for the other electronic message.

8. The method of claim 7, further comprising:
determining that, in addition to the variable value, the corresponding value of the expression of the number of expressions comprises a constant portion that remains constant across the electronic messages in the assigned set; and
retrieving the variable value from the corresponding value of the other electronic message.

9. The method of claim 1, further comprising:
determining, via the computing device and for an electronic message of the corpus, a digital signature based on the set of expressions, each expression of the set leading to a textual leaf in a DOM tree of the electronic message; and
the assigning further comprising using the digital signature of the electronic message in assigning the electronic message to a cluster of the plurality, such that a common digital signature is shared by each electronic message in the assigned set of the cluster.

10. The method of claim 9, further comprising:
before automatically extracting data from the other electronic message, determining that the other electronic message belongs to the cluster, the determining comprising:
determining, via the computing device and for the other electronic message, a digital signature based on the set of expressions; and
determining, via the computing device, that the digital signature determined for the other electronic message matches a common digital signature shared by each electronic message in the assigned set of the cluster.

11. The method of claim 10, determining that the other electronic message belongs to the cluster further comprising:
determining that a sender domain of the other electronic message matches a sender domain of each electronic message in the assigned set of the cluster.

12. The method of claim 11, each expression of the set leading to a textual leaf in a DOM tree of the electronic message and each expression of the set leading to a textual leaf in the DOM tree of the other electronic message.

13. The method of claim 1, further comprising communicating at least some of the extracted data and each associated annotation to be communicated to a search engine for use in generating a search index for use in electronic message searching.

14. The method of claim 1, further comprising communicating at least some of the extracted data and each associated annotation to a recommendation system for use in determining at least one interest of a user of the recommendation system, the at least one interest of the user for use in making at least one recommendation to a user at a computing device of the user.

15. The method of claim 14, the recommendation system comprises an advertising content recommendation system, and the at least one interest is for use in determining advertising content for presentation to the user at a computing device of the user.

16. A non-transitory computer-readable storage medium tangibly encoded with computer-executable instructions that when executed by a processor associated with a computing device perform a method comprising:
retrieving a corpus of electronic messages, each electronic message of the corpus using an internal format comprising a plurality of expressions;
assigning each electronic message of the corpus to one cluster of a plurality of clusters, a cluster of the plurality having an assigned set of electronic messages from the corpus of electronic messages, the cluster having an associated set of expressions shared by each electronic message in the assigned set;
identifying a variable value in connection with a number of expressions in the set of expressions, the variable value indicating that at least a portion of a value corresponding to the number of expressions varies across the number of electronic messages;
analyzing the variable value corresponding to multiple electronic messages of the number of electronic messages to determine an annotation;
automatically refining the annotation, comprising:
using a value corresponding to at least one other expression of the set to determine a meaning of the variable value; and
using the meaning of the variable value to refine the annotation;
automatically generating, for the cluster, a data extraction rule comprising the annotation associated with each expression having the variable value;
automatically extracting, using the automatically-generated data extraction rule, data from another electronic message; and
communicating at least some of the automatically extracted data to an entity.

17. The non-transitory computer-readable storage medium of claim 16, communicating at least some of the automatically extracted data to an entity further comprising communicating at least some of the extracted data and associated annotations to a client application for display in an electronic message information summary display at a client device.

18. The non-transitory computer-readable storage medium of claim 16, further comprising communicating at least some of the extracted data and each associated annotation to be communicated to a search engine for use in generating a search index for use in electronic message searching.

19. The non-transitory computer-readable storage medium of claim 16, further comprising communicating at least some of the extracted data and each associated annotation to a recommendation system for use in determining at least one interest of a user of the recommendation system, the at least one interest of the user for use in making at least one recommendation to a user at a computing device of the user.

20. A computing device comprising:
 a processor;
 a non-transitory storage medium for tangibly storing thereon program logic for execution by the processor, the program logic comprising:
  retrieving logic executed by the processor for retrieving a corpus of electronic messages, each electronic message of the corpus using an internal format comprising a plurality of expressions;
  assigning logic executed by the processor for assigning each electronic message of the corpus to one cluster of a plurality of clusters, a cluster of the plurality having an assigned set of electronic messages from the corpus of electronic messages, the cluster having an associated set of expressions shared by each electronic message in the assigned set;
  identifying logic executed by the processor for identifying a variable value in connection with a number of expressions in the set of expressions, the variable value indicating that at least a portion of a value corresponding to the number of expressions varies across the number of electronic messages;
  analyzing logic executed by the processor for analyzing the variable value corresponding to multiple electronic messages of the number of electronic messages to determine an annotation;
  refining logic executed by the processor for automatically refining the annotation, comprising:
  using logic executed by the processor for using a value corresponding to at least one other expression of the set to determine a meaning of the variable value; and
  using logic executed by the processor for using the meaning of the variable value to refine the annotation;
  generating logic executed by the processor for automatically generating, for the cluster, a data extraction rule comprising the annotation associated with each expression having the variable value;
  extracting logic executed by the processor for automatically extracting, using the automatically-generated data extraction rule, data from another electronic message; and
  communicating logic executed by the processor for communicating at least some of the automatically extracted data to an entity.

* * * * *